US 6,711,677 B1

(12) United States Patent
Wiegley (10) Patent No.: US 6,711,677 B1
(45) Date of Patent: Mar. 23, 2004

(54) SECURE PRINTING METHOD (75) Inventor: Rose E. Wiegley, Bishop Way Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/351,452

(22) Filed: Jul. 12, 1999

(51) Int. Cl.[7] .................................................. H04L 9/00
(52) U.S. Cl. ........................ 713/151; 713/161; 713/201
(58) Field of Search ........................... 380/51, 55, 285; 705/60, 62; 713/150, 170, 154, 176, 172, 171; 709/224, 225

(56) References Cited

U.S. PATENT DOCUMENTS

| | | | | |
|---|---|---|---|---|
| 4,881,264 A | * | 11/1989 | Merkle ........................ | 713/177 |
| 5,196,840 A | * | 3/1993 | Leith et al. ................. | 340/5.26 |
| 5,633,932 A | * | 5/1997 | Davis et al. ................. | 713/176 |
| 5,699,493 A | * | 12/1997 | Davidson et al. ........... | 358/1.15 |
| 6,378,070 B1 | * | 4/2002 | Chan et al. .................. | 713/155 |

OTHER PUBLICATIONS

William W. Plummer, "TCP Checksum Function Design", Jun. 5, 1978, http://www.cis.ohio-state.edu/cgi-bin/rfc/rfc1071.html pp. 12–25.*

WinLink Website materials, 5 pages.

* cited by examiner

Primary Examiner—Gregory Morse
Assistant Examiner—Christopher J. Brown (57) ABSTRACT

An encryption security system for printer client/printer communications that reduces or eliminates the risk of replay attacks. The validity of a secure print job is determined using a public/private key pair. The printer client encrypts print data using the public key of the public/private key pair or, preferably, a session key. If the print job is determined to be valid, the printer decrypts the print data and prints the data. In one preferred version of the invention, the validity of the print job is determined by (1) the printer generating and storing a print session identifier, (2) the printer sending the session identifier to the printer client, (3) the printer client sending the session identifier back to the printer along with the encrypted print data in a manner that ties the session identifier to the print data, and (4) the printer determining if the session identifier received from the printer client has changed from that originally sent to the printer client and if the session identifier received from the printer client is in storage. If the session identifier has not changed and it is in storage, then the printer deletes the session identifier from storage and prints the print data.

12 Claims, 13 Drawing Sheets

SECURE PRINTING METHOD

FIELD OF THE INVENTION

The invention relates generally to a system for secure printing and, more particularly, to an encryption system for printer/printer client communications that deters the unauthorized printing of encrypted data.

BACKGROUND OF THE INVENTION

A variety of encryption systems have been devised to secure data transmissions between computers. One type of encryption security system often used for private and public network data transmissions uses both public and secret key cryptography. Public key cryptography uses a pair of keys—one private and one public—for encryption. Secret key cryptography, by contrast, uses only one key for encryption. Dual key systems typically use the public/private key pair to authenticate the transaction and then a single secret "session" key to encrypt the main data transmission and any other subsequent communications. The Secure Sockets Layer (SSL) protocol popular with TCP/IP application developers to secure data transmissions over the Internet is one example of a dual key encryption system. The SSL protocol works as follows.

1. The client computer requests a secure connection with a server computer and sends the server its public key.
2. The server generates a random message and sends the message to the client.
3. The client uses its private key to encrypt the random message received from the server and sends it back to the server.
4. The server decrypts the message using the client's public key. If the decrypted message matches the random message generated by the server, the server knows it is communicating with the owner of the public/private key pair (i.e., the client).
5. The server then creates a secret session key, encrypts the session key with the client's public key and sends it to the client.
6. The client decrypts the session key with its private key. The client and the server then use the session key to send and receive further communications.

While encryption security systems are widely known for use with client/server and other computer to computer data transmissions, such systems have not yet been adapted for use to secure communications between a printer client and a printer. Printer client to printer communications present a unique security problem because the confidential data is printed, and often at a printer accessible to numerous users. The security of a confidential print job may be breached if the encrypted print data is copied and then resubmitted to the printer as an authorized print job. The unauthorized copying of encrypted print data for the purpose of simulating an authorized print job is referred to as a "replay attack."

SUMMARY OF THE INVENTION

Accordingly, the present invention is directed to an encryption security system for printer client/printer communications that reduces or eliminates the risk of replay attacks. The validity of a secure print job is determined using a public/private key pair. The printer client encrypts print data using the public key of the public/private key pair or, preferably, a session key. If the print job is determined to be valid, the printer decrypts the print data and prints the data.

In one preferred version of the invention, the validity of the print job is determined by (1) the printer generating and storing a print session identifier, (2) the printer sending the session identifier to the printer client, (3) the printer client sending the session identifier back to the printer along with the encrypted print data in a manner that ties the session identifier to the print data, and (4) the printer determining if the session identifier received from the printer client has changed from that originally sent to the printer client and if the session identifier received from the printer client is in storage. If the session identifier has not changed and it is in storage, then the printer deletes the session identifier from storage and prints the print data.

The "validity" of a print job may be manifested in different ways for different embodiments of the invention and the printer's response to an invalid print job may vary. If the printer actually detects an error, it may refuse the print request and report the error to the user. If the printer does not detect the error but the print job is not valid, it will print garbage. For example, if a session identifier is used as described above, the print job is determined to be not valid if the session identifier is not in storage and the print request is, therefore, refused. If a session identifier is not used, and the bare public/private key encryption is relied on to determine validity, then a print job is deemed not valid if the print data cannot be decrypted with the printer's private key. In that case, the printer will print an error message or garbage in response to the invalid print request.

It is expected that, in most operating environments, the printer client will generate the session key, encrypt the session key using the printer's public key and send the encrypted session key to the printer. The printer decrypts the session key using the printer's private key and then uses the session key to decrypt the print data.

For added security, the invention may also include detecting any change in the print data made after the printer client sends the encrypted print data to the printer. This may be accomplished, for example, by the printer client computing a hash value for the print data. A hash value is a unique identifier for data computed from that data. The printer client encrypts the hash value using the session key and sends the encrypted hash value to the printer. The printer computes a hash value for the decrypted print data it has received. The printer decrypts the hash value from the printer client and compares it to the hash value it has computed for the decrypted print data. If the print data is modified between the printer client and the printer, then the hash value computed by the printer client from the original data will not match the hash value computed by the printer from the modified data, and the printer will not print the data. If the hash values are the same, the printer knows that no changes were made to the print data after it was send by the printer client, and the printer can then print the data.

DETAILED DESCRIPTION OF THE INVENTION

Figure 1:
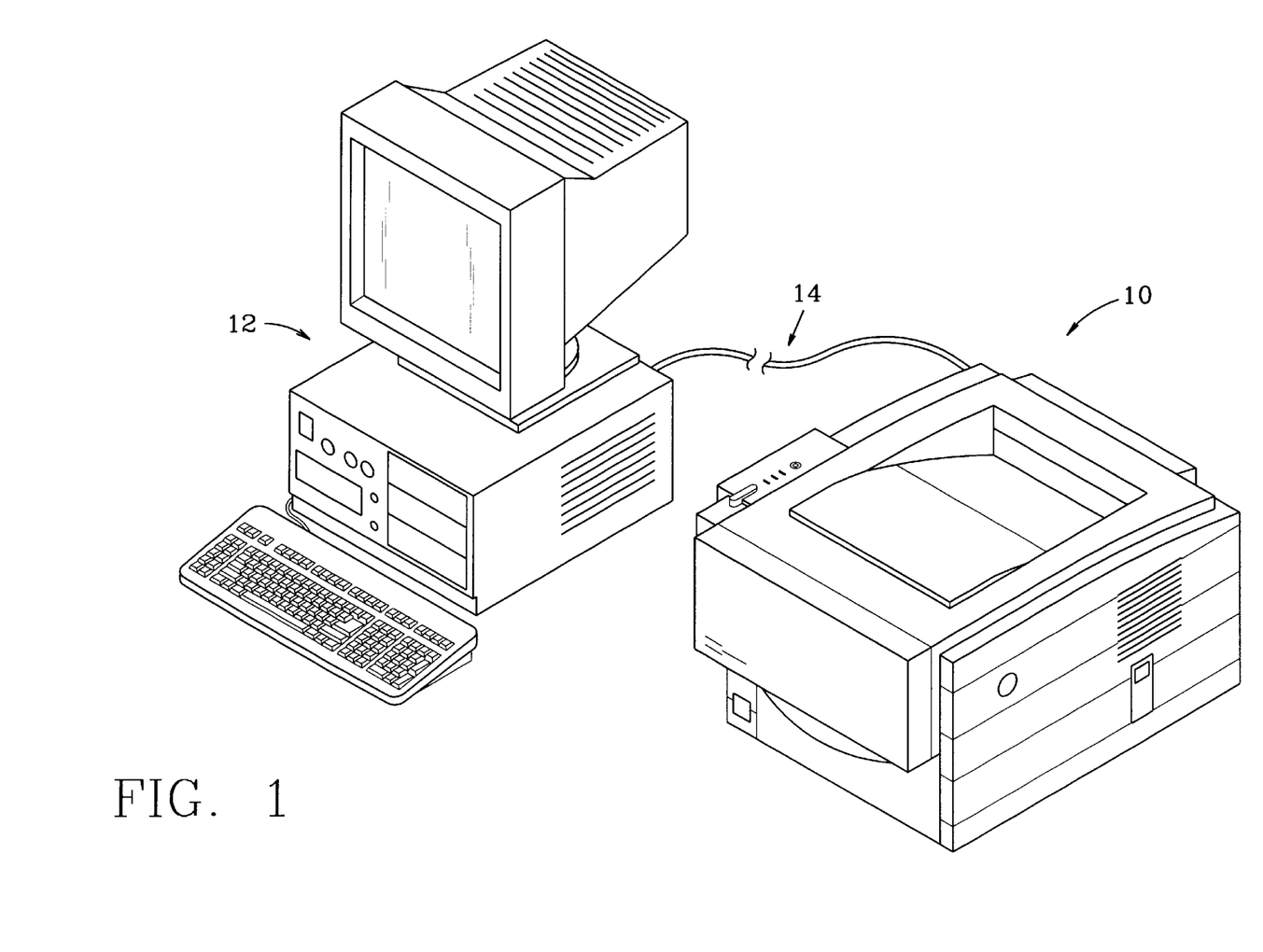
FIG. 1 is an idealized perspective representation of a computer/printer system implementing the secure printing features of the present invention.
Figure 2:
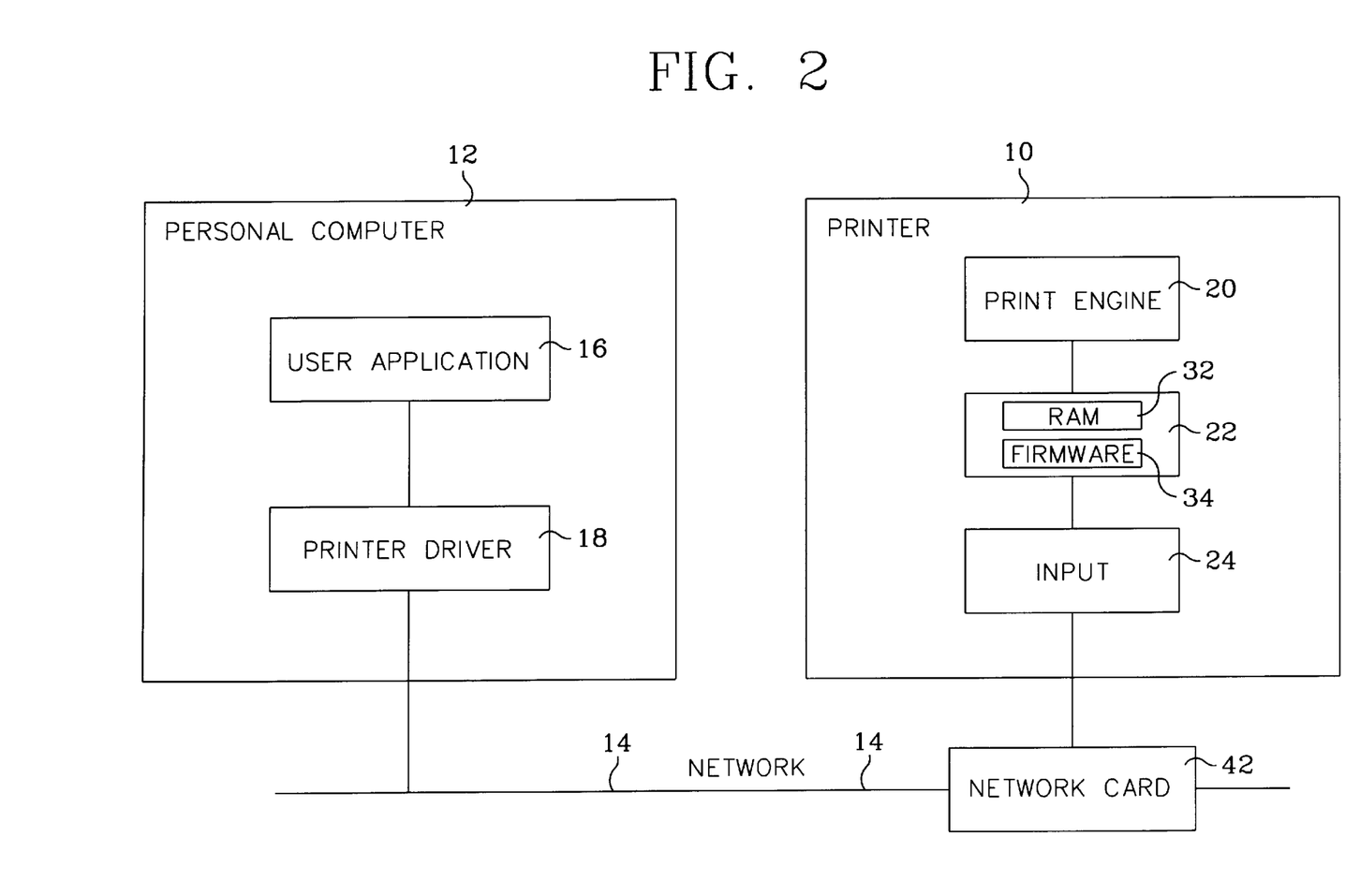
FIG. 2 is a schematic representation of the system of FIG. 1.

Referring to FIGS. 1–2, the invention is shown implemented on a laser printer 10 and a computer 12. Computer 12 represents generally any printer client capable of sending print jobs to printer 10. The invention is not limited to laser printers. It is equally applicable to other image forming devices including Mopiers®, ink jet printers, impact printers, thermal printers, fax machines and the like. In this particular embodiment of the invention, a personal computer 12 is connected to a printer 10 through a network 14. The basic components of printer 10 and computer 12 are shown schematically in FIG. 2.

The connection between computer 12 and printer 10 may be a direct connection using a parallel or serial cable such as that shown in FIG. 1, a wireless or remote connection via a telecommunication link, an infrared link or a radio frequency link, or any other connector or system that establishes bi-directional communication between printer 10 and computer 12. Although the invention may be used with a print server or other intermediate facilities between computer 12 and printer 10, a direct connection between computer 12 and printer 10 is preferred.

Computer 10 has a document generating application software 16 and associated printer driver 18 in its memory. Printer driver 18 is modified from its conventional form to implement the security steps performed by the printer client as described below. Printer 10 has a print engine 20 connected to a controller/formatter 22 which receives data to be printed from input 24. Input 24 represents generally, for example, a parallel input/output (PIO) port or channel, a serial input/output (SIO) port or channel, an enhanced input/output (EIO) port or channel and remote or wireless couples. Controller 22 includes electronics connecting controller 22 to the inputs, processing electronics, random access memory (RAM) 32, firmware 34 and associated electronics connecting controller 22 to print engine 20. The controlling firmware 34 for the controller 22 typically resides in a read only memory (ROM).

Firmware 34 is modified from its conventional form to implement the security steps performed by the printer as described below. The invention may be implemented in existing printers and Mopiers by substituting a modified firmware/ROM 34 for the existing the ROM.

Figure 3A:
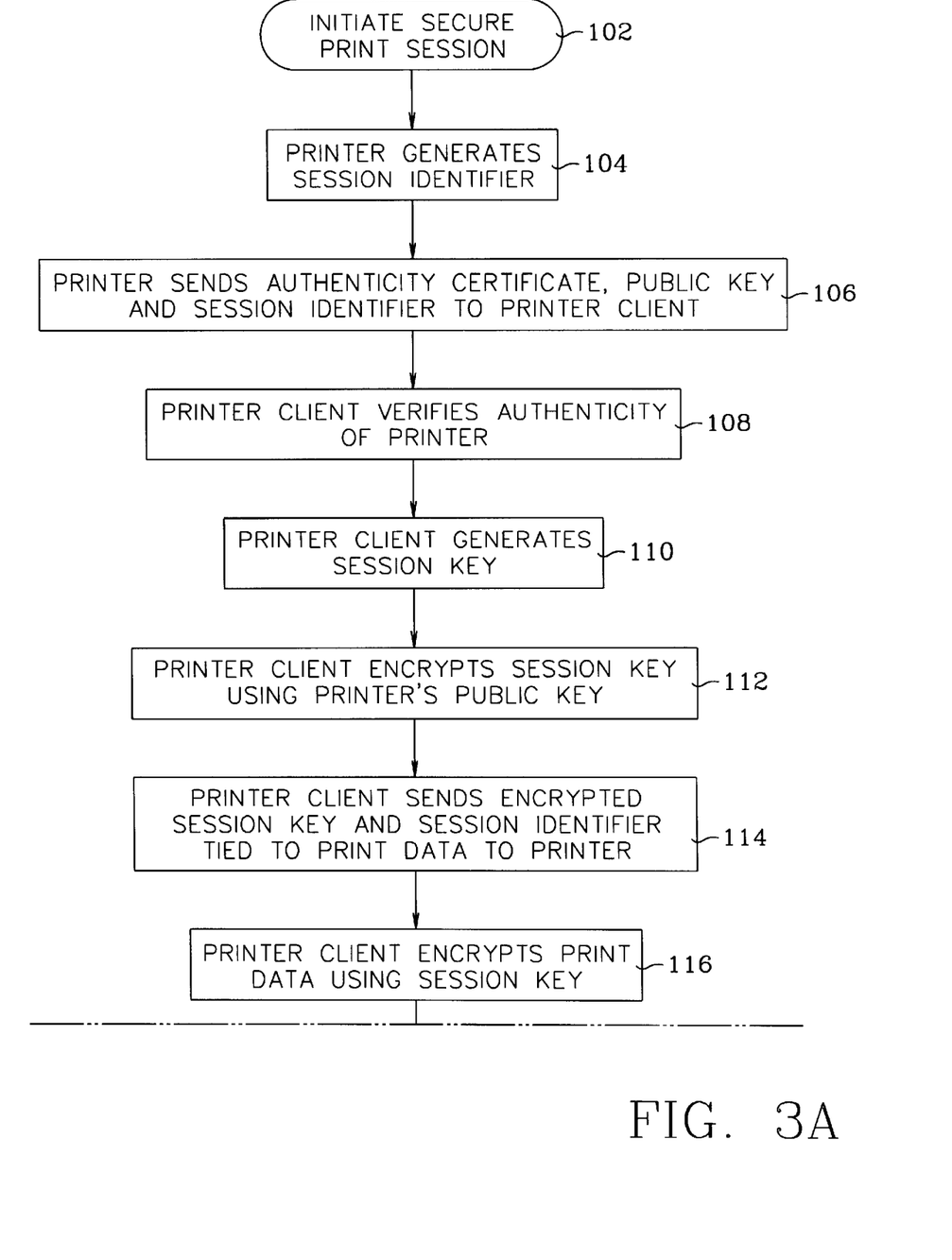
FIGS. 3A and 3B are a flow chart showing the sequence of steps for secure printing according to one embodiment of the invention.
Figure 8:
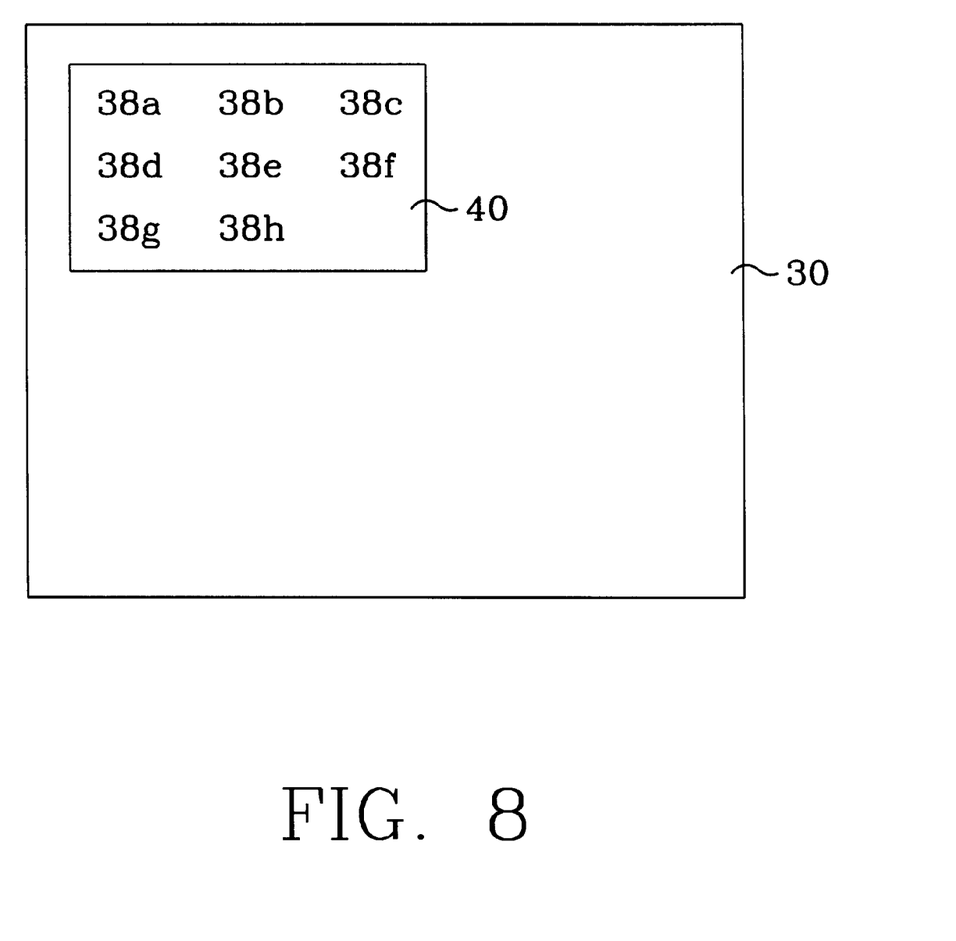
FIG. 8 is a block diagram illustrating the session identifier table maintained in the printer.

One embodiment of the invented method for secure printing will now be described with reference to the flow chart of FIGS. 3A and 3B. Secure printing is initiated in step 102 when computer 12 requests a secure print session from printer 14. "Print session" refers generally to the entire transaction between computer 12 and printer 10 relating to a particular print job. "Print job" refers to the print data generated by computer 12 and the instructions from computer 12 that accompany the data directing printer 10 to print the data. In step 104, printer 14 generates a session identifier 38a and stores session identifier 38a in, for example, a table 40 in disk drive 30, RAM 32 or another suitable memory area of printer 10. Table 40 may contain other session identifiers 38b–38h as shown in FIG. 8. Each session identifier 38 should be a unique combination of numbers, letters and/or other characters generated or selected by printer 10. A "unique" identifier as used in this Specification and in the appended Claims means any combination of numbers, letters and/or other characters that will not be repeated, at least not for an extended period of time. The time period will be sufficiently extended if it is longer than the time a hacker could have continuous access to the printer to generate repeated session identifiers. Each session identifier 38, for example, might be the cumulative number of pages printed by printer 10 at the time the identifier is generated.

Session identifiers 38 should be stored in a non-volatile memory if delayed printing is desired. One type of delayed printing in which a user may delay printing until a personal identification number (PIN) is entered at the printer control panel is described in the section on Private Printing in U.S. patent application Ser. No. 09/181,177, filed Oct. 26, 1998 and entitled MULTIPLE COPY PRINTER WITH PRINT JOB RETENTION which is incorporated herein by reference in its entirety.

Next, printer 10 sends an encryption public key and session identifier 38a to computer 12 in step 106. A public key is the key in the public/private key pair used in asymmetric cryptography that is given out to computer 12 and other printer clients when secure printing is desired. The other key in the pair, the private key, is kept secret and known only to the printer. Preferably, printer 10 sends its public key as part of an authenticity certificate. The authenticity certificate is a collection of data about the printer that includes its name, the name of the authenticating authority and the authority's signature. If an authenticity certificate is used, computer 12 verifies that the certificate comes from a secure printer, as indicated in step 108. The authenticity certificate, which is common in conventional security systems that use, for example, VeriSign™ certificates, provides an added measure of security that helps prevent printer impersonations.

Once computer 12 verifies the authenticity of the transmission from printer 10 in step 108, computer 12 generates a secret encryption key commonly referred to as a "session" key, in step 110. The computer may generate the session key using a predefined key generation algorithm or selecting one from a group of predefined algorithms. Using the printer's public key, computer 12 encrypts the session key and sends the encrypted session key and the session identifier to printer 10, as indicated in steps 112 and 114. The session identifier is sent to printer 10 in a manner that ties the session identifier to the print data. In steps 116 and 118, the print data is encrypted with the session key and sent to printer 10. Any of the various conventional secret key encryption algorithms may be used for encrypting data with the session key including, for example, Data Encryption Standard (DES), RSA's RC4 or the IDEA algorithm. The public/private key and secret session key cryptography used in to implement the invention is well known to those skilled in the art and details of these systems may be obtained from a variety of commercially available sources. Bruce Schneier's Applied Cryptography: Protocols, Algorithms, and Source Code in C (2ed 1995), for example, is one of many authoritative sources of information for both public key and secret key cryptography.

In step 120, printer 10 decrypts the session key using its private key. In steps 150 and 122, printer 10 determines whether the session identifier received from computer 12 has been changed from the original session identifier sent in step 106 and whether the session identifier is in storage (in this case table 40). If the session identifier has not changed and it is in storage, then printer 10 knows the session identifier it sent to computer 12 has not been changed or a false identifier submitted by a print imposter and the print job is deemed valid. The session identifier is deleted from storage and the print data is decrypted using the session key in step 124. The data is then printed in step 126. If the session identifier has been changed or it does not appear in session identifier table 40, the print job is deemed not valid as indicated in step 128 and it is discarded. The deletion of the session identifier from storage deters a "replay attack" in which the same print job is copied in transit and sent to printer 10 a second time for printing. When the print job arrives a second time at printer 10, the session identifier (session identifier 38a, for example) will not appear in table 40 and, therefore, the print job will be deemed not valid.

Figure 4A:
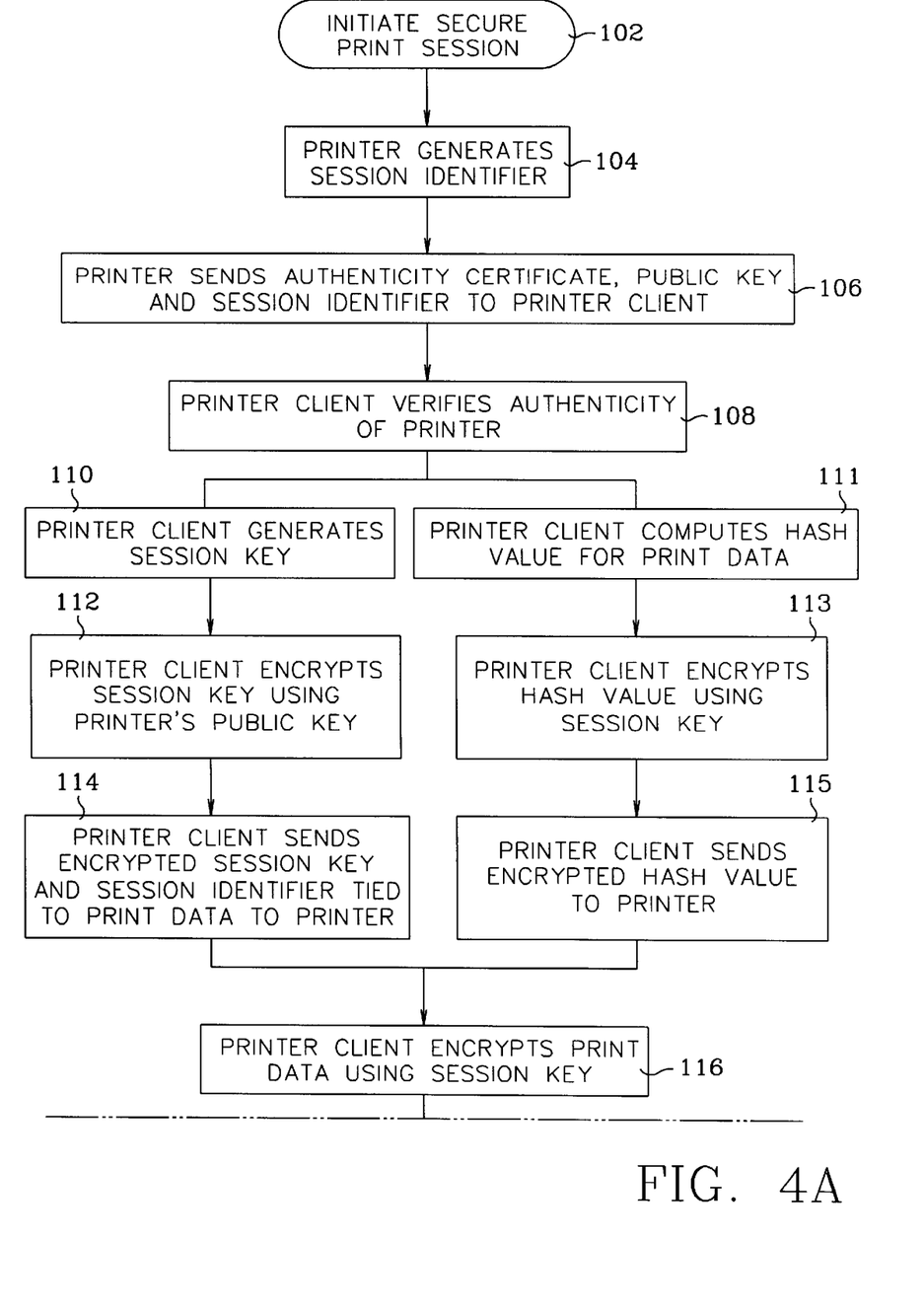
FIGS. 4A and 4B are a flow chart showing the sequence of steps for secure printing according to a second embodiment of the invention in which a hash value is computed for the print data.
Figure 4B:
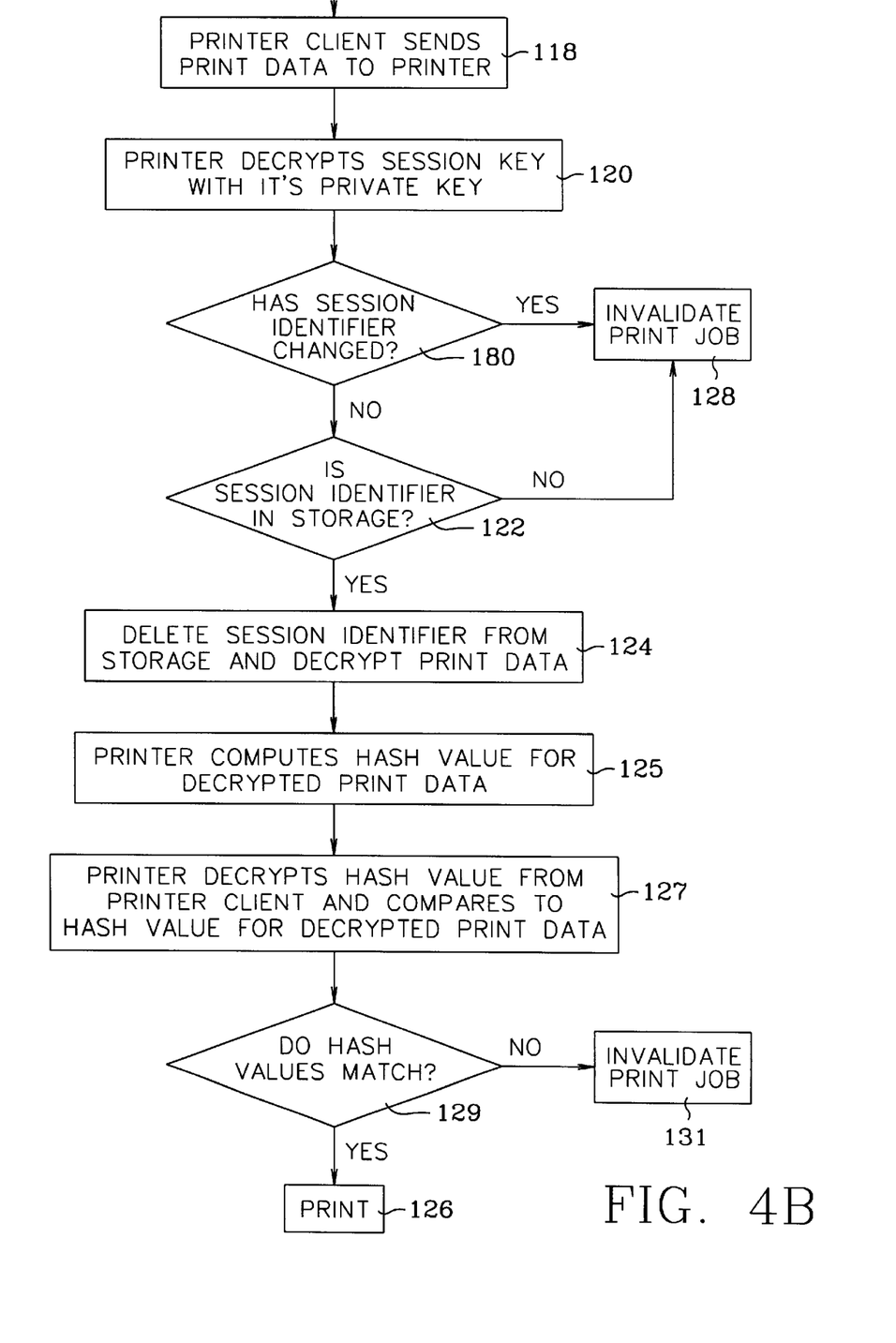

For added security, the invention may include detecting any change in the print data made after the printer client sends the encrypted print data to the printer. This may be accomplished, for example, by the printer client computing a hash value for the print data as shown in the flow chart of FIGS. 4A and 4B. A hash value is a unique identifier for data computed from that data. It is desirable, therefore, that computer 12 compute a hash value for the print data, encrypt the hash value using the session key and send the encrypted hash value to printer 10 along with the encrypted print data as shown in steps 111, 113 and 115 in FIG. 4A. In steps 125, 127 and 131, printer 10 computes a hash value for the decrypted print data, decrypts the hash value from computer 12, and compares it to the hash value it has computed for the decrypted print data as shown in FIG. 4B. If the print data is modified between the computer 12 and printer 10, then the hash value computed by computer 12 from the original data will not match the hash value computed by printer 10 from the modified data, and printer 10 will not validate the print job as indicated in step 131. If the hash values are the same, printer 10 knows that no changes were made to the print data after it was sent by computer 12, and the printer can validate the print job and print the data.

Figure 3B:
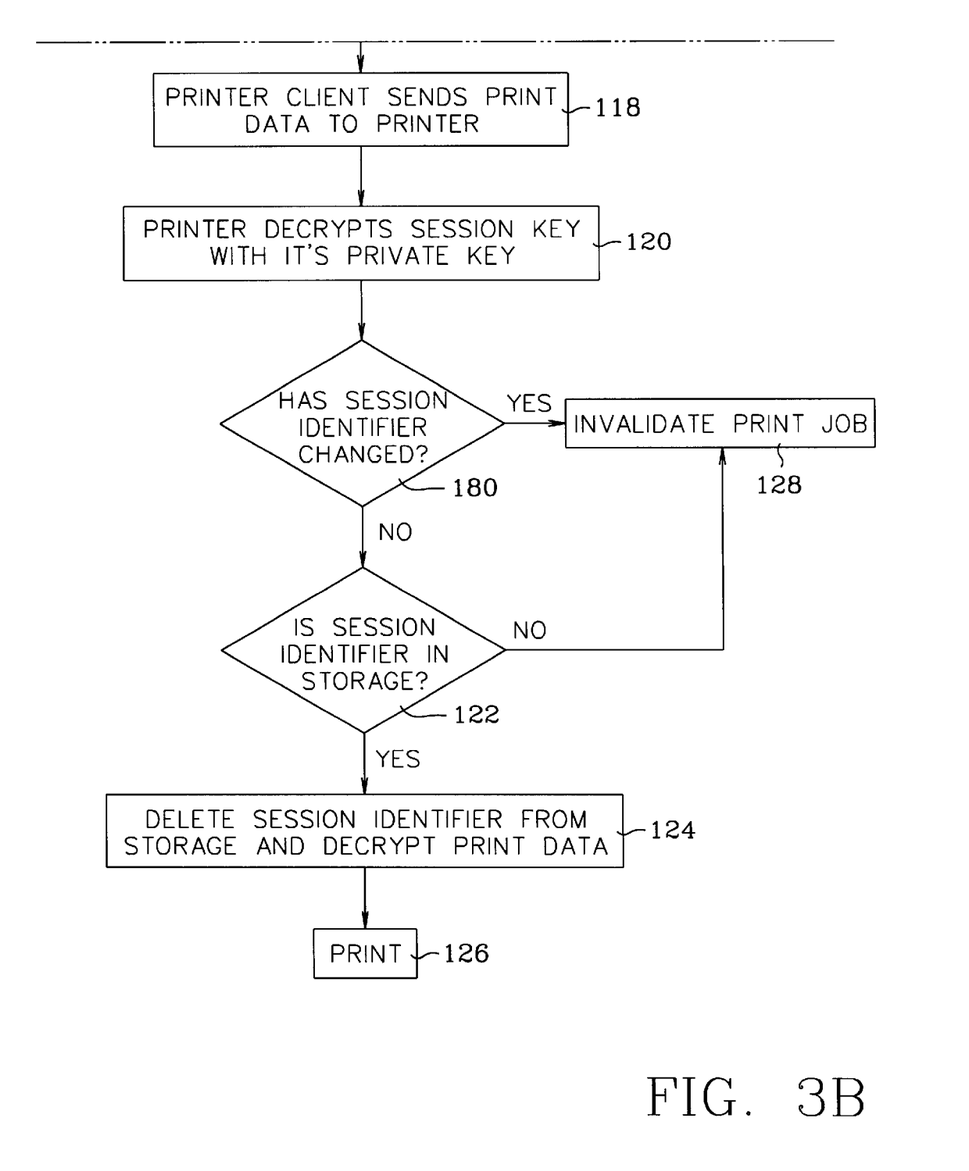
Figure 5A:
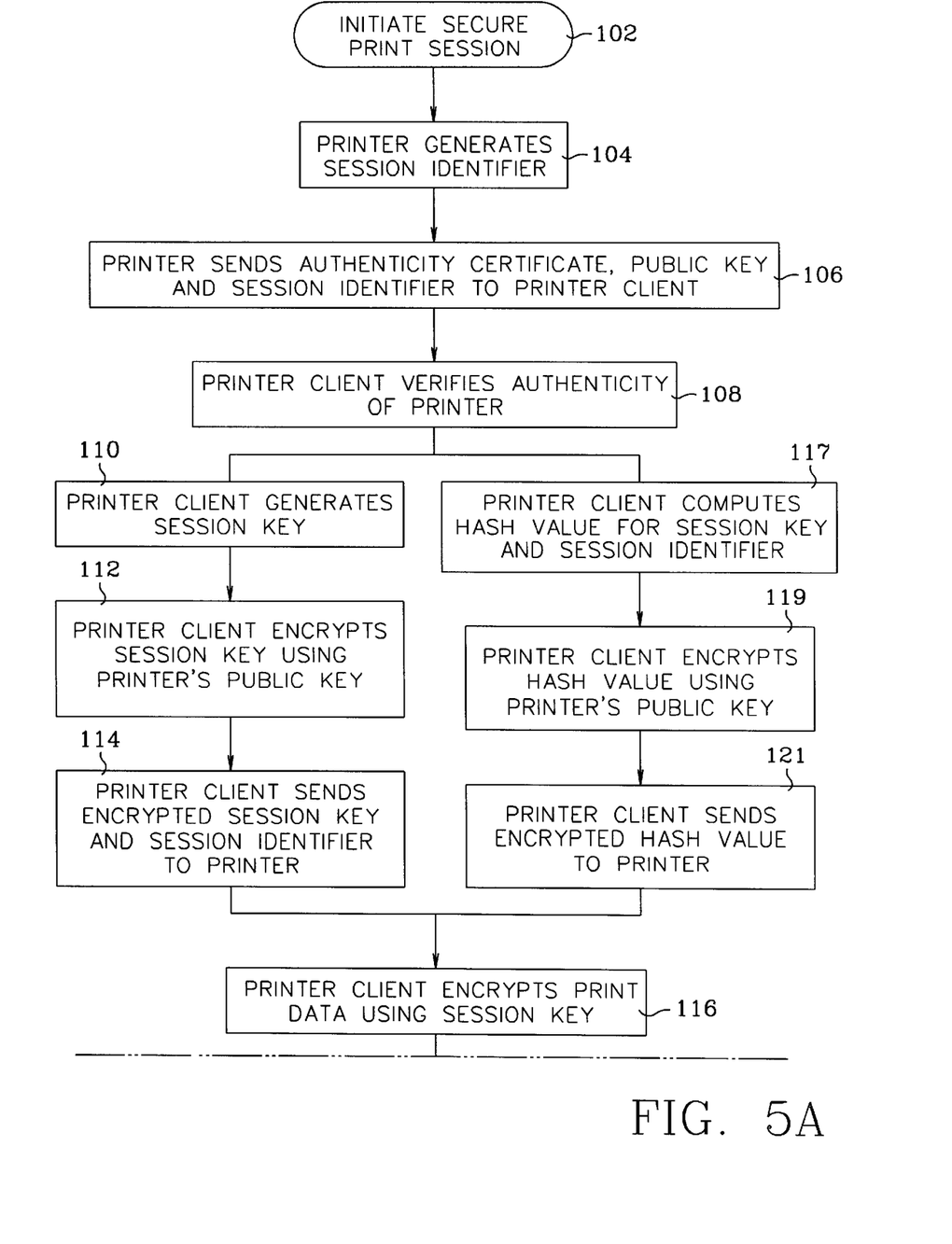
FIGS. 5A and 5B are a flow chart showing the sequence of steps for secure printing according to another embodiment of the invention in which a hash value is computed for the session key and session identifier.
Figure 5B:
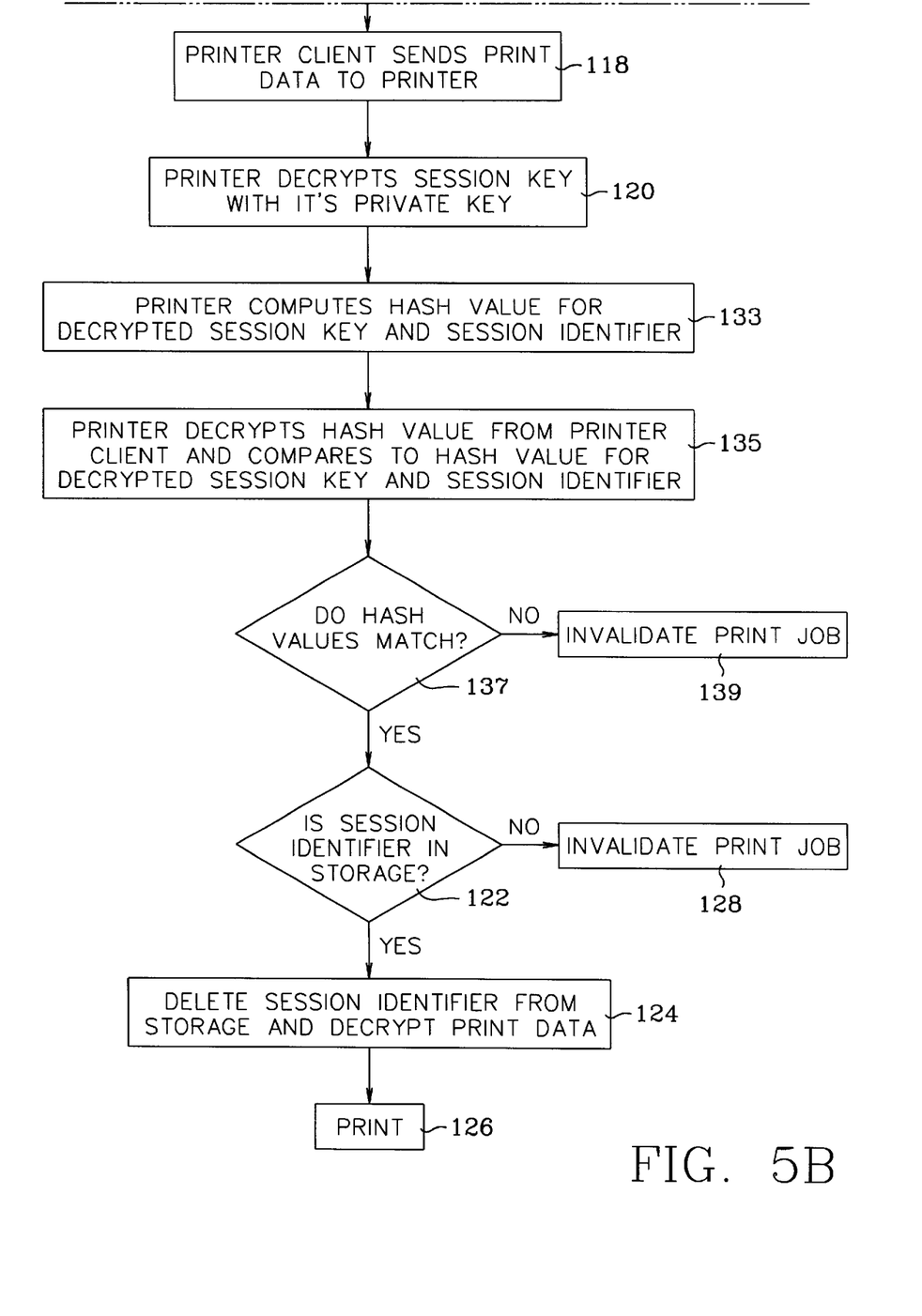

The flow charts of FIGS. 5, 6 and 7 illustrate three methods for implementing the steps of tieing the session identification to the print data (step 114 in FIG. 3A) and determining if the session identifier has changed (step 150 in FIG. 3B). Additional security is gained through these methods by detecting any change in the session identifier made after the printer client sends the session identifier to the printer. In the first method illustrated in the flow chart of FIGS. 5A and 5B, a hash value is computed for the session identifier and the session key. Referring to FIGS. 5A and 5B, computer 12 computes a hash value for the session key and the session identifier in step 117. In steps 119 and 121, computer 12 encrypts the hash value using the printer's public key and sends it to printer 10 along with the encrypted session key and the session identifier. The hash value prevents an imposter from modifying the session identifier and then resending the print data with the modified session identifier. If a hash value is used, then printer 10 also decrypts the hash value received from computer 12, computes the hash value for the decrypted session key and the session identifier and compares the two hash values, as indicated in step 133, 135 and 137. If the hash values match, then the session identifier and session key are deemed valid and the print process may continue. If the hash values do not match, the print job is deemed not valid as indicated in step 139 and the print job is discarded.

Figure 6A:
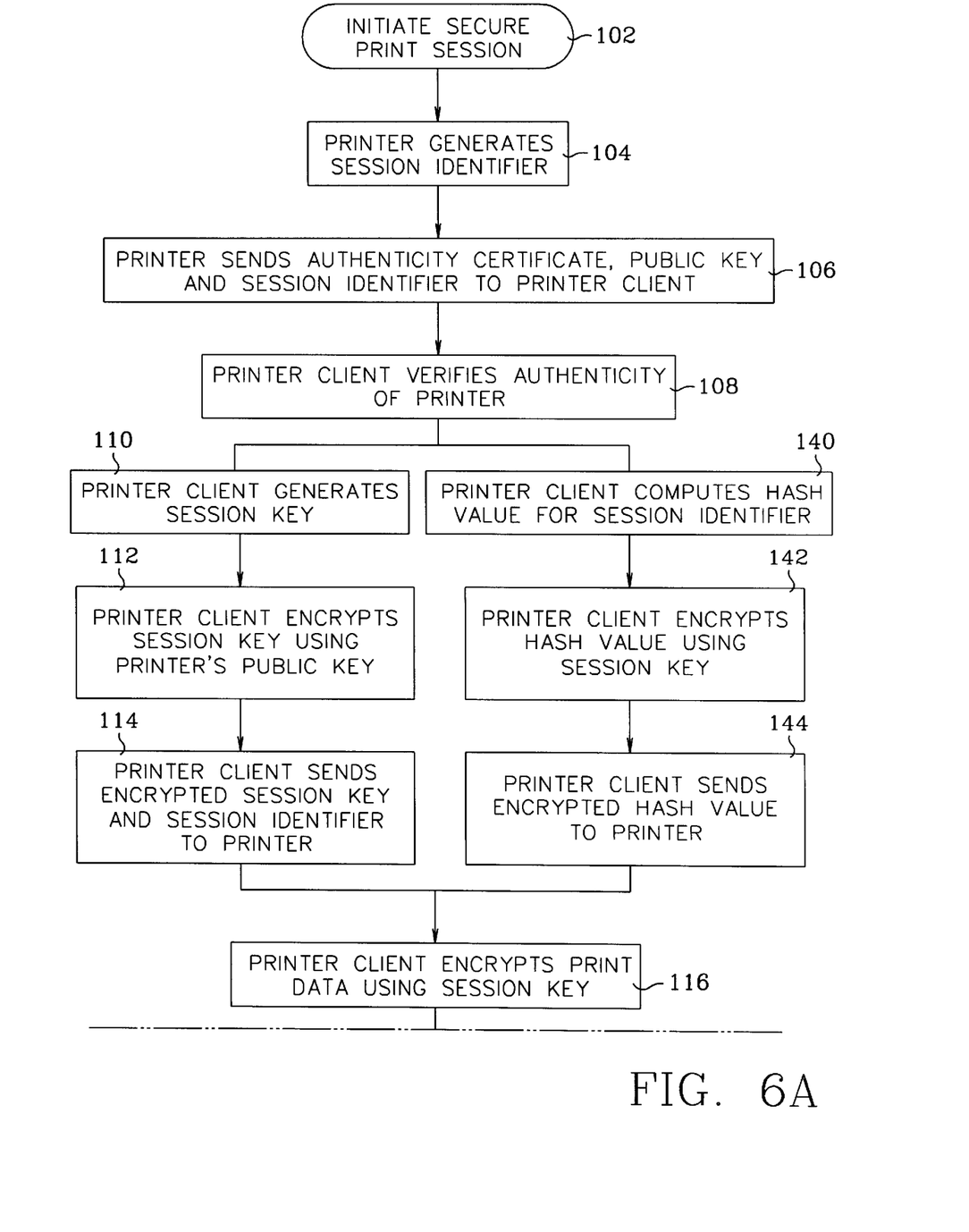
FIGS. 6A and 6B are a flow chart showing the sequence of steps for secure printing according to another embodiment of the invention in which a hash value is computed for the session identifier, the hash value is encrypted with the session key and sent to the printer.
Figure 6B:
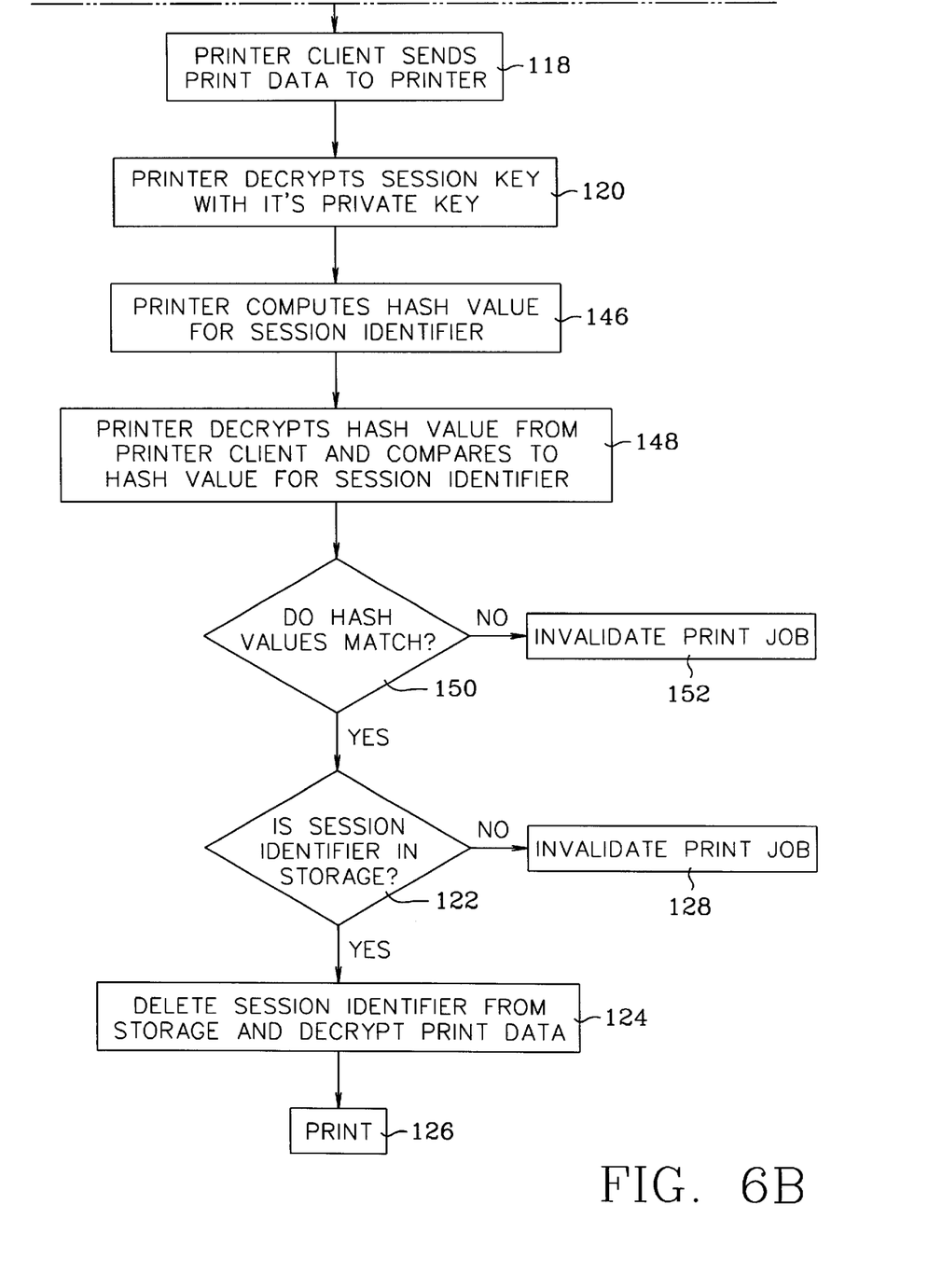

In the second method illustrated in the flow chart of FIGS. 6A and 6B, a hash value is computed only for the session identifier but this hash value is encrypted with the session key and then sent to the printer. Referring to FIGS. 6A and 6B, computer 12 compute a hash value for the session identifier, encrypts the hash value using the session key and sends the encrypted hash value to printer 10 along with the session identifier as shown in steps 140, 142 and 144. In steps 146, 148 and 150, printer 10 computes a hash value for the session identifier it receives, decrypts the hash value from computer 12, and compares it to the hash value it has computed for the session identifier. If the session identifier is modified between the computer 12 and printer 10, then the hash value computed by computer 12 from the original data will not match the hash value computed by printer 10 from the modified data, and printer 10 will not validate the print job as indicated in step 152. If the hash values are the same, printer 10 knows that no changes were made to the session identifier originally submitted to computer 12 for this print job, and the printer can validate the print job and print the data.

Figure 7A:
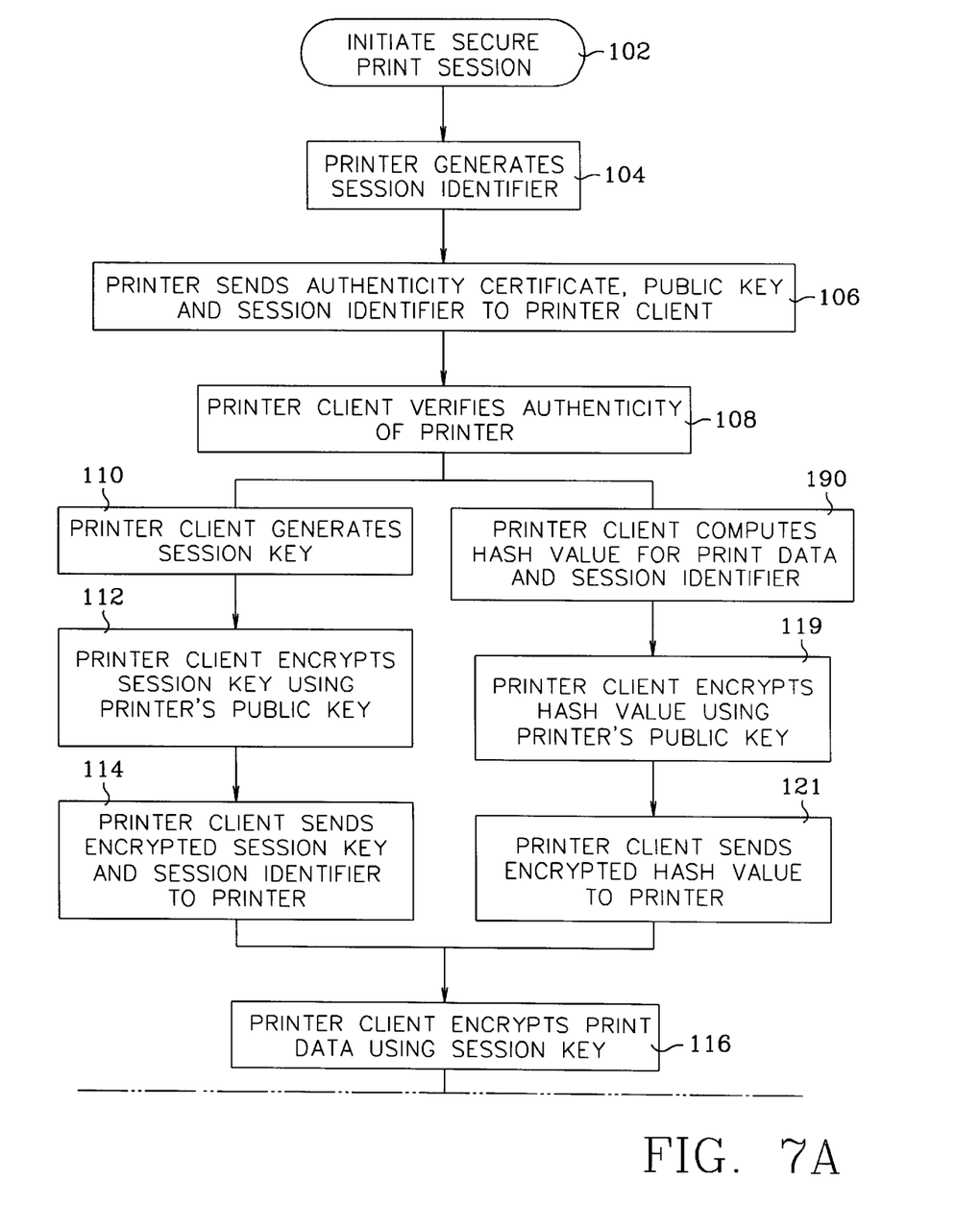
FIGS. 7A and 7B are a flow chart showing the sequence of steps for secure printing according to another embodiment of the invention in which a hash value is computed for the print data and the session identifier.
Figure 7B:
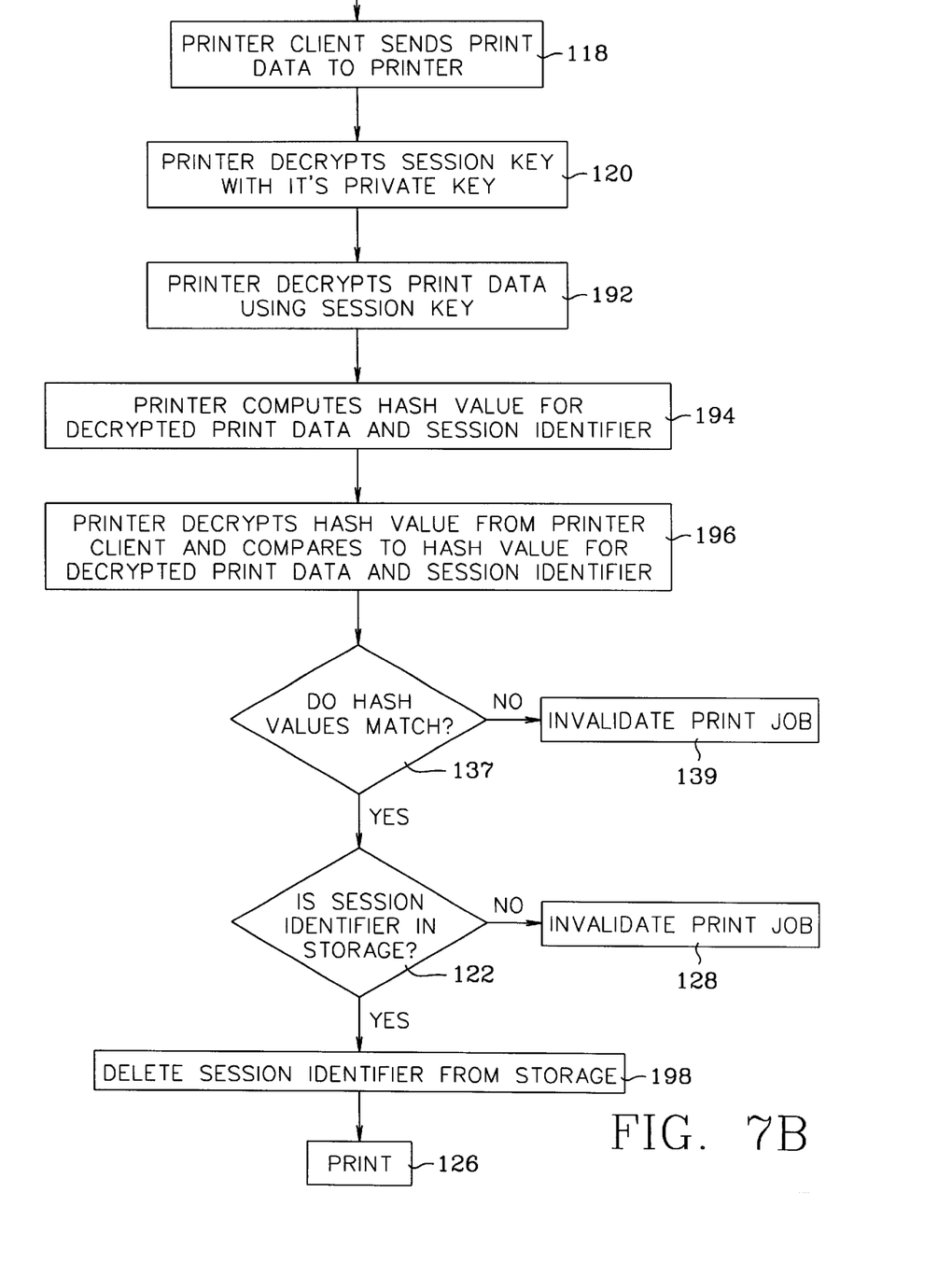

In a third method illustrated in the flow chart of FIGS. 7A and 7B, a hash value is computed for the session identifier and the print data. Referring to FIGS. 7A and 7B, computer 12 computes a hash value for the print data and the session identifier in step 190. In steps 119 and 121, computer 12 encrypts the hash value using the printer's public key and sends it to printer 10 along with the encrypted session key and the session identifier. Printer 10 decrypts the print data and the hash value received from computer 12, computes the hash value for the decrypted print data and the session identifier and compares the two hash values, as indicated in step 192–196. If the hash values match, then the session identifier and session key are deemed valid and the print process may continue. If the hash values do not match, the print job is deemed not valid as indicated in step 139 and the print job is discarded.

While the present invention has been shown and described with reference to the foregoing exemplary embodiments, it is to be understood that other forms and details may be made thereto without departing from the spirit and scope of the invention as expressed in the following claims.

What is claimed is:

1. A method for secure printing between a printer client and a printer, comprising:

the printer generating and storing a session identifier;

the printer sending the session identifier to the printer client;

the printer client encrypting print data;

the printer client sending the encrypted print data to the printer;

the printer client computing a first hash value for the print data and the session identifier and the printer client encrypting the first hash value and sending the encrypted first hash value to the printer;

the printer decrypting the encrypted print data;

the printer computing a second hash value for the decrypted print data and session identifier, the printer decrypting the first hash value, and the printer comparing the first hash value to the second hash value; and if the first and second hash values match and if the session identifier is in storage, the printer deleting the session identifier from storage and printing the data.

2. A method for secure printing between a printer client and a printer, comprising:

the printer client computing a first hash value for the print data;

the printer client encrypting the print data and sending the encrypted print data to the printer;

the printer client encrypting the first hash value and sending the encrypted first hash value to the printer;

the printer decrypting the encrypted print data;

the printer computing a second hash value for the decrypted print data;

the printer decrypting the first hash value;

the printer comparing the first hash value to the second hash value; and if the hash values match, printing the print data.

3. The method of claim 2, wherein the step of encrypting the first hash value comprises encrypting the first hash value using a session key and the step of decrypting the first hash value comprises decrypting the first hash value using the session key.

4. The method of claim 2, wherein the step of encrypting the first hash value comprises encrypting the first hash value using a public key in a public/private encryption key pair and the step of decrypting the first hash value comprises decrypting the first hash value using the printer's private key.

5. A method for secure printing between a printer client and a printer, comprising:

the printer generating a session identifier;

the printer sending the session identifier to the printer client;

the printer client encrypting data to be printed and sending the encrypted print data to the printer;

the printer client computing a first hash value for the print data and the session identifier and the printer client encrypting the first hash value and sending the encrypted first hash value to the printer;

the printer decrypting the print data;

the printer computing a second hash value for the decrypted print data and session identifier;

the printer decrypting the first hash value;

the printer comparing the first hash value to the second hash value; and if the first and second hash values are the same, the printer printing the print data.

6. A method for secure printing between a printer client and a printer, comprising:

initiating a secure print job with a public/private encryption key pair the printer generating and storing a session identifier;

the printer sending the public key and the session identifier to the printer client;

the printer client generating a session key;

the printer client encrypting the session key using the printer's public key and sending the encrypted session key to the printer;

the printer client computing a first hash value for the print data;

the printer client encrypting the first hash value and sending the encrypted first hash value to the printer;

the printer client encrypting data to be printed using the session key and sending the encrypted print data to the printer;

the printer client sending the session identifier to the printer in a manner that ties the session identifier to the print data;

the printer decrypting the session key using its private key;

the printer decrypting the print data using the session key;

the printer determining if the session identifier has changed;

the printer determining if the session identifier is in storage;

the printer computing a second hash value for the decrypted print data;

the printer decrypting the first hash value;

the printer comparing the first hash value to the second hash value; and if the hash values match and if the session identifier has not changed and the session identifier is in storage, the printer deleting the session identifier from storage and printing the print data.

7. A computer readable medium having instructions thereon for:

the printer generating and storing a session identifier;

the printer sending the session identifier to the printer client;

the printer client computing a first hash value for the print data and the session identifier and the printer client encrypting the first hash value and sending the encrypted first hash value to the printer;

the printer client encrypting print data;

the printer client sending the encrypted print data to the printer;

the printer decrypting the encrypted print data;

the printer computing a second hash value for the decrypted print data and session identifier, the printer decrypting the first hash value, and the printer comparing the first hash value to the second hash value; and if the first and second hash values match and if the session identifier is in storage, the printer deleting the session identifier from storage and printing the data.

8. A computer readable medium having instructions thereon for:

the printer client computing a first hash value for print data;

the printer client encrypting the print data and sending the encrypted print data to the printer;

the printer client encrypting the first hash value and sending the encrypted first hash value to the printer;

the printer decrypting the encrypted print data;

the printer computing a second hash value for the decrypted print data;

the printer decrypting the first hash value;

the printer comparing the first hash value to the second hash value; and if the hash values match, printing the print data.

9. The medium of claim 8, wherein encrypting the first hash value comprises encrypting the first hash value using the session key and encrypting the first hash value comprises decrypting the first hash value using the session key.

10. The medium of claim 8, wherein encrypting the first hash value comprises encrypting the first hash value using a public key in a public key/private key pair and the step of decrypting the first hash value comprises decrypting the first hash value using the printer's private key.

11. A computer readable medium having instructions thereon for:

the printer generating a session identifier;

the printer sending the session identifier to the printer client;

the printer client encrypting data to be printed and sending the encrypted print data to the printer;

the printer client computing a first hash value for the print data and the session identifier and the printer client encrypting the first hash value and sending the encrypted first hash value to the printer;

the printer decrypting the print data;

the printer computing a second hash value for the decrypted print data and session identifier;

the printer decrypting the first hash value;

the printer comparing the first hash value to the second hash value; and if the first and second hash values are the same, the printer printing the print data.

12. A computer readable medium having instructions thereon for:

initiating a secure print job with a public/private encryption key pair the printer generating and storing a session identifier;

the printer sending the public key and the session identifier to the printer client;

the printer client generating a session key;

the printer client encrypting the session key using the printer's public key and sending the encrypted session key to the printer;

the printer client computing a first hash value for the print data;

the printer client encrypting the first hash value and sending the encrypted first hash value to the printer;

the printer client encrypting data to be printed using the session key and sending the encrypted print data to the printer;

the printer client sending the session identifier to the printer in a manner that ties the session identifier to the print data;

the printer decrypting the session key using its private key;

the printer decrypting the print data using the session key;

the printer determining if the session identifier has changed;

the printer determining if the session identifier is in storage;

the printer computing a second hash value for the decrypted print data;

the printer decrypting the first hash value;

the printer comparing the first hash value to the second hash value; and if the hash values match and if the session identifier has not changed and the session identifier is in storage, the printer deleting the session identifier from storage and printing the print data.

\* \* \* \* \*

UNITED STATES PATENT AND TRADEMARK OFFICE
CERTIFICATE OF CORRECTION

PATENT NO. : 6,711,677 B1
DATED : March 23, 2004
INVENTOR(S) : Rose E. Wiegley

It is certified that error appears in the above-identified patent and that said Letters Patent is hereby corrected as shown below:

Column 2,
Line 52, delete "send" and insert therefor -- sent --

Column 3,
Line 61, after "existing" delete "the"

Column 4,
Line 63, after "used" delete "in"

Column 5,
Line 49, delete "tieing" and insert therefor -- tying --

Column 6,
Line 11, delete "compute" and insert therefor -- computes --

Column 8,
Line 66, after "using" delete "the" and insert therefor -- a --

Signed and Sealed this

Eleventh Day of January, 2005

JON W. DUDAS
*Director of the United States Patent and Trademark Office*